No. 893,638. PATENTED JULY 21, 1908.
C. E. MILLER.
VULCANIZER FOR REPAIRING TIRES.
APPLICATION FILED SEPT. 11, 1907.
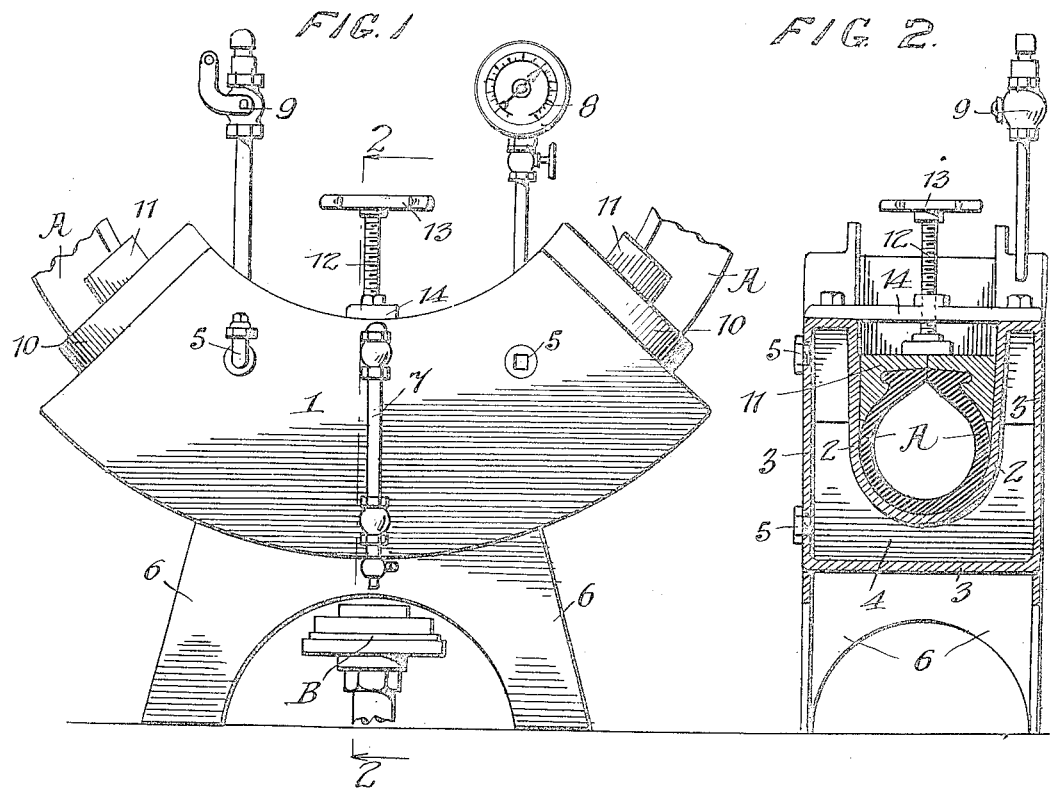
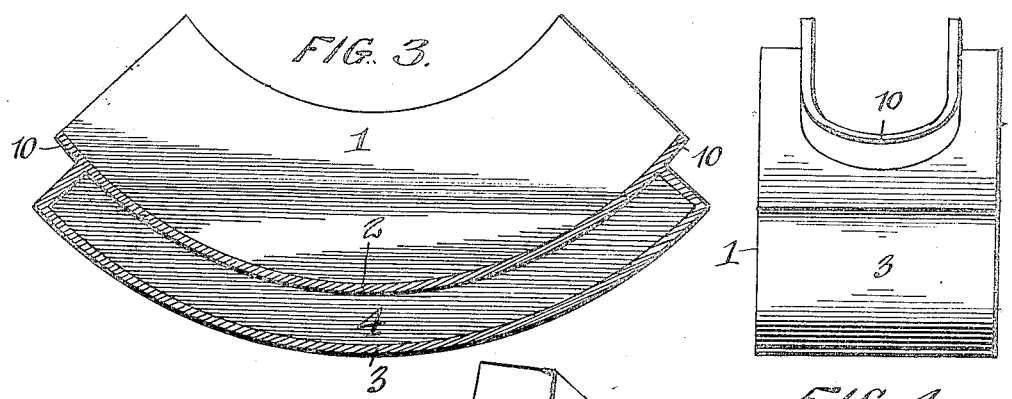
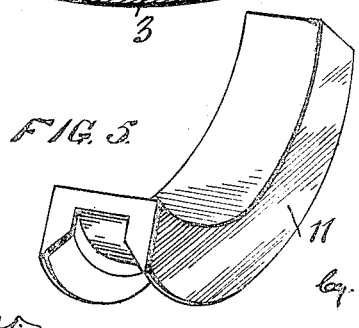
WITNESSES
Chas. K. Davies
Myron G. Clear
INVENTOR
Charles E. Miller,
by C. L. Parker
Attorney

UNITED STATES PATENT OFFICE.

CHARLES E. MILLER, OF ANDERSON, INDIANA.

VULCANIZER FOR REPAIRING TIRES.

No. 893,638.  Specification of Letters Patent.  Patented July 21, 1908.

Application filed September 11, 1907. Serial No. 392,335.

*To all whom it may concern:*

Be it known that I, CHARLES E. MILLER, a citizen of the United States, residing at Anderson, in the county of Madison and State of Indiana, have invented certain new and useful Improvements in Vulcanizers for Repairing Tires, of which the following is a specification.

My invention relates to vulcanizers, and particularly contemplates the provision of a simple, compact and inexpensive structure especially adapted for repairing wheel tires and their casings of different sizes and makes and to prevent the formation of ridges in the tire at the ends of the heated vulcanizer.

My invention further and specifically resides in the following features of construction, arrangement and operation as will be hereinafter described with reference to the accompanying drawings forming a part of this specification, in which like numerals are used to designate like parts throughout the several figures, and in which Figure 1 is a side elevation of my improved vulcanizer set up for operation, Fig. 2 is a transverse sectional view taken therethrough on the line 2—2 of Fig. 1, Fig. 3 is a central longitudinal sectional view through the body of the vulcanizer attached, Fig. 4 is an end elevation thereof, and Fig. 5 is a perspective view of one of the bead strips.

In the practical embodiment of my invention I provide a vulcanizer comprising a body portion 1 having its inner walls 2 curved to provide a longitudinal channel for the reception of a tire or its casing A therein. The body 1 is preferably cast in a single piece with its outer walls 3 of a rectangular form, and cored out to provide a steam space 4 between said walls 2 and 3. The outer wall 3 on one side is provided with openings normally fitted with plugs or nipples 5, and designed for the inlet and outlet of steam supply thereto through a suitable source for heating the inner walls 2. When however, it is desired to generate the steam within the body of the vulcanizer, water may be supplied within a space 4 between the walls 2 and 3 and a suitable burner B may be provided beneath the same and within a suitable supporting stand 6. In this form a suitable water gage 7 is provided, and in either form a pressure indicator 8 is provided to indicate the steam pressure, and an alarm 9 is provided to sound upon an excessive pressure within the space 4.

It will be apparent that, with the vulcanizer body constructed as described, the tire or casing A being vulcanized will be finished with ridges therein at either end of the vulcanizer because of the intense heat of the inner walls 2. To obviate this difficulty in the simplest manner, I provide said walls with flanges 10 extending longitudinally thereof beyond the ends of the outer walls 3. These flanges 10 extending outwardly are cooled sufficiently by the atmosphere to prevent the formation of the objectionable ridges in the tires or their casings just referred to.

To securely hold the tire or its casing within and against the surface of the inner heated walls 2 of the vulcanizer, without pinching or wrinkling the fabric, operating different sizes and makes of tires and casings, I provide interchangeable bead strips 11, one of which is shown in section in Fig. 2 and another of a different shape and curvature of which is shown in Fig. 5. The bead strips 11 are constructed to fit tires of different shapes and curvatures having bearing beads, and are adjustable to slip up and down upon the straight surface of the inner walls 2 to adjust the surface of the tire firmly and uniformly against said walls. The means for adjusting the interchangeable bead strips 11 comprises a threaded rod 12 having a hand wheel 13 secured upon its upper end and engaging through a threaded opening in a bridge plate 14, and bearing with its lower end upon said bead strips, the bridge plate 14 being secured centrally and transversely of the vulcanizer body 1, and spanning the tire channel.

From the foregoing description it will be apparent that I provide a simple, compact and durable structure which may be readily operated by a person comparatively unfamiliar with the work, and with slight danger of failure or damage to the tire or its casing.

Having thus fully described my invention, I claim:

A vulcanizer having its body portion cast in a single piece and cored out to provide a space between its outer and inner walls for the reception of steam, or water from which steam may be generated therein, said inner walls being curved to provide a channel for the reception of the tire or casing to be vulcanized and being provided with air cooled flanges extending therefrom beyond the ends of the outer walls, interchangeable bead strips adjustably arranged to slide upon the straight portions of said inner walls, to force different sizes and makes of tires and casings firmly and uniformly against the surface of said inner walls, and a single adjusting member for operating said bead strips mounted centrally of the length of said vulcanizer body, substantially as described.

In testimony whereof I affix my signature in presence of two witnesses.

CHARLES E. MILLER.

Witnesses:
 THOS. BAGOT,
 CHAS. K. BAGOT.